(12) United States Patent
Olson et al.

(10) Patent No.: US 7,676,541 B2
(45) Date of Patent: Mar. 9, 2010

(54) PEER COMMUNICATION CHANNEL PARTITIONING

(75) Inventors: Lance E. Olson, Sammamish, WA (US); Eric K. Zinda, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1011 days.

(21) Appl. No.: 10/158,419

(22) Filed: May 30, 2002

(65) Prior Publication Data

US 2003/0225895 A1    Dec. 4, 2003

(51) Int. Cl.
G06F 15/16    (2006.01)
(52) U.S. Cl. .................. 709/204; 709/228; 709/202
(58) Field of Classification Search .............. 709/202, 709/204, 228
See application file for complete search history.

(56) References Cited

U.S. PATENT DOCUMENTS

| | | | |
|---|---|---|---|
| 5,832,514 A | 11/1998 | Norin et al. | |
| 6,009,456 A | 12/1999 | Frew et al. | |
| 6,016,393 A | 1/2000 | White et al. | |
| 6,055,562 A | 4/2000 | Devarakonda et al. | |
| 6,065,039 A | 5/2000 | Paciorek | |
| 6,065,040 A | 5/2000 | Mima et al. | |
| 6,115,736 A | 9/2000 | Devarakonda et al. | |
| 6,134,580 A | 10/2000 | Tahara et al. | |
| 6,163,855 A | 12/2000 | Shrivastava et al. | |
| 6,192,354 B1 | 2/2001 | Bigus et al. | |
| 6,233,601 B1 | 5/2001 | Walsh | |
| 6,282,563 B1 | 8/2001 | Yamamoto et al. | |
| 6,282,582 B1 | 8/2001 | Oshima et al. | |
| 6,330,588 B1 | 12/2001 | Freeman | |
| 6,334,146 B1 | 12/2001 | Parasnis et al. | |
| 6,691,151 B1 * | 2/2004 | Cheyer et al. ............... | 709/202 |
| 6,785,819 B1 * | 8/2004 | Sakakura .................... | 713/200 |
| 6,788,688 B2 * | 9/2004 | Trebes, Jr. ............... | 370/395.1 |
| 2002/0184310 A1 * | 12/2002 | Traversat et al. ............ | 709/204 |

OTHER PUBLICATIONS

United Devices, Inc.™, printed from http://www.ud.com/home.htm, Apr. 24, 2002, 1 page.
Products: MetaProcessor™ platform version 2.1, printed from http://www.ud.com/products/mp_platform.htm, Apr. 24, 2002, 2 pages.
Projects: Cancer Research , printed from http://members.ud.com/projects/cancer/, Apr. 24, 2002, 1 page.
Grid computing—printed from http://searchwebservices.techtarget.com/sDefinition/0,,sid26_gci773157,00.html, May 21, 2002, 3 pages.

(Continued)

*Primary Examiner*—Tonia L Dollinger
*Assistant Examiner*—Kyung H Shin
(74) *Attorney, Agent, or Firm*—Workman Nydegger

(57) ABSTRACT

Communication channels are partitioned among active nodes in an unbounded computing space. A node may register with a discovery system to obtain an address window (that may correspond to a range of IP addresses). The node communicates only with nodes in accordance with the address window. Even though a partition corresponds to a subset of the nodes in the unbounded computing space, the partition overlaps with partitions of other nodes so that all nodes may interact with each other, either directly or indirectly. Because a node may be cognizant of a small subset of active nodes in the unbounded computing space, both security and scalability are supported.

24 Claims, 9 Drawing Sheets

OTHER PUBLICATIONS

B. Rostamzadeh et al., "DACAPO: A Distributed Computer Architecture for Safety-Critical Control Applications", Intelligent Vehicles '95 Symposium, Sep. 25-26, 1995, pp. 376-381.

J. Gosling, "The Feel of Java", IEEE Computer Society, Jun. 1997, pp. 53-57.

K. Minato et al., "Multipath Allocation Control in Communication Network Using Cooperative Distributed Multi-Agent Model", Denishi Joho Tsushin Gakkai, Nov. 1991, vol. J 74 B-1, No. 11, pp. 909-918.

L. Goldschlager, "A Universal Interconnection Pattern for Parallel Computers", Journal of the Association for Computing Machinery, vol. 29, No. 3, Jul. 1982, pp. 1073-1086.

E. Krieger et al., *Models@Home: distributed computing in bioinformatics using a screensaver based approach*, Oxford University Press, Feb. 2002, vol. 18, No. 2, pp. 315-318.

D. Liang et al., "A fault-tolerant object service on CORBA", The Journal of Systems and Software, vol. 48, No. 3, Nov. 1999, pp. 197-211.

W. Reisig, "Distributed Algorithms: Modeling and Analysis with Petri Nets", IEEE International Conference on Systems, Man, And Cybernetics, vol. 1, 1998, pp. 38-43.

M. Portmann et al., "The Cost of Peer Discovery and Searching in the Gnutella Peer-to-peer File Sharing Protocol", IEEE, 2001, pp. 263-268.

N. Eng et al., "An Initial Approach of a Scalable Multicast-based Pure Peer-to-Peer System", IEEE Proceedings of the First International Conference on Peer-to-Peer Computing, Aug. 27, 2001, pp. 97-98.

A. Loo et al., "A peer-to-peer distributed selection algorithm for the Internet", Internet Research: Electronic Networking Applications and Policy, vol. 12, No. 1, 2002, pp. 16-30.

C. J. Anumba et al., "Collaborative design of structures using intelligent agents", Automation in Construction, 2002, pp. 89-103.

B. Boutsinas et al., "On distributing the clustering process", Pattern Recognition Letters, vol. 23, No. 8, 2002, pp. 999-1008.

* cited by examiner

PEER COMMUNICATION CHANNEL PARTITIONING

FIELD OF THE INVENTION

The invention generally relates to distributed computing architectures. More specifically, the invention relates to enabling peers to communicate with each other.

BACKGROUND OF THE INVENTION

Distributed computing systems are generally known in the art. However, known distributed computing systems typically divide a single large computing task into sub-tasks, and each participant in the distributed computing system performs or solves the sub-task that it was given. In addition, each distributed computer generally only works on its assigned sub-task when its processor or other resources necessary to the sub-task would otherwise be idle.

For example, one known distributed computing system is the Intel-United Devices Cancer Research Project sponsored by United Devices, Inc. of Austin, Tex. and Intel Corporation of Santa Clara, Calif. The Cancer Research Project allows PC owners to volunteer idle processor time on their own computers to help find a cure for cancer. Each user downloads a software client that periodically receives a research sub-task from a server, and performs the sub-task when the local computer processor would otherwise be idle. Upon completion of the sub-task, the local client sends the results to the server, and receives a new sub-task. At all times the local client is dependent on the central server that divides the task into sub-tasks and assigns sub-tasks to volunteer client machines. In addition, each client does not contribute to the computing space except that the client performs an assigned sub-task. That is, each client only executes sub-tasks defined by the server; because each client is not capable of executing any arbitrary application program Another known pseudo-distributed computing space is demonstrated by online role-playing games such as Ultima Online®. In an online role-playing game (RPG), each remote user typically must log in to a central server that administers and oversees the game playing of the RPG. The virtual world in which characters live is defined by and maintained by the central server, and appears identical to each remote client (player characters) connected to that central server. In addition, all interaction between players goes through the central server. Thus, while online RPGs may be thought of as distributed computing environments, they are in reality large client-server applications.

The prior art may necessitate that a node (associated with a client or a peer) in a fully connected distributed system may need to know about addresses of every other node in the distributed computing environment or may need to know about a subset of the other nodes and about an associated network topology. In either case, the amount of information may be quite formidable with a large distributed computing environment.

Also, the need to know about every other node in the distributed computing environment may pose a security and privacy problem while necessitating an additional task of updating the node as the configuration of the distributed computing environment changes.

Thus, it would be an advancement in the art to provide a method or apparatus in which a node knows only about a subset of the other nodes in the distributed computing environment without the need to know about the network topology while the distributed computing environment maintains fully connected properties. It would be a further advancement in the art if the computing space provided both scalability and security.

BRIEF SUMMARY OF THE INVENTION

The inventive method and system overcome the problems of the prior art by providing a partitioning (which may correspond to a subset of IP addresses) in an unbounded computing space, in which nodes may communicate with each other. In an embodiment of the invention, a node registers with a discovery system in order to obtain an address window. The node communicates only with nodes in the address window. Even though a partition corresponds to a subset of the nodes in the unbounded computing space, the partition overlaps with partitions of other nodes so that all nodes may interact either directly or indirectly. Because the node may be cognizant of a small subset of active nodes in the unbounded computing space, the length of messaging between the discovery system and the node is constrained, thus providing scalability as the number of nodes within the unbounded computing space increases. In addition, because the node has a limited knowledge of other nodes, security is enhanced.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Aspects of the invention provide an unbounded computing space in which programs can execute. One or more aspects of the invention are applicable to any general purpose computing platform capable of running a variety of operating systems, virtual machines, and applications, including PCs running WINDOWS®, LINUX®, MacOS®, or SOLARIS® brand operating systems and the like, as well as PDA devices, Tablet PCs, pen-based computers, and other data processing systems.

Figure 1:
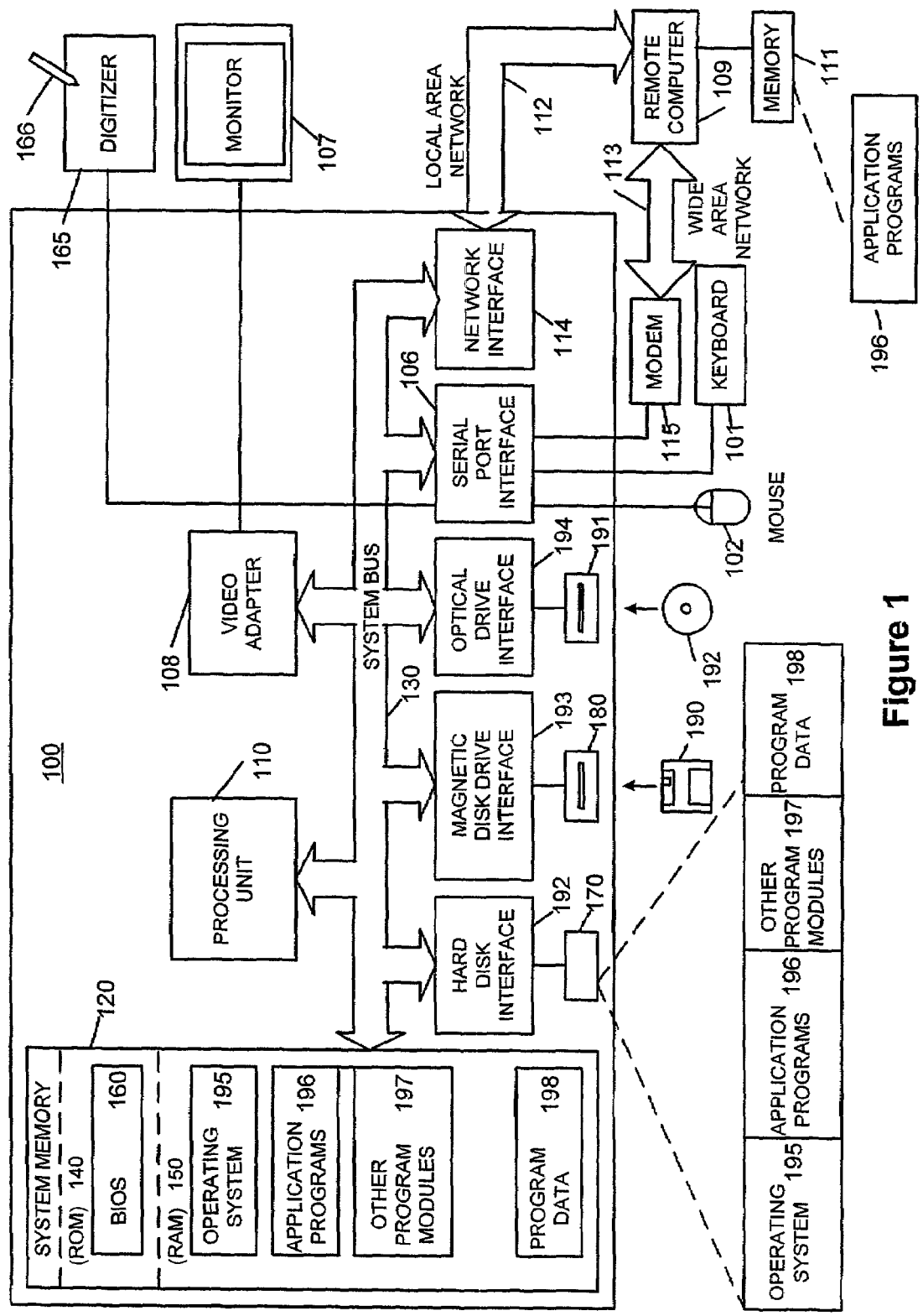
FIG. 1 illustrates a schematic diagram of an exemplary general-purpose digital computing environment that may be used to implement various aspects of the invention.

FIG. 1 illustrates a schematic diagram of an exemplary conventional general-purpose digital computing environment that may be used to implement various aspects of the invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges random access memories (RAMs), read only memories (ROMs), and the like, may also be used in the example operating environment.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 101 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers. As one example, a pen digitizer 165 and accompanying pen or user input device 166 are provided in order to digitally capture freehand input. The pen digitizer 165 may be coupled to the processing unit 110 via the serial port interface 106 and the system bus 130, as shown in FIG. 1, or through any other suitable connection. Furthermore, although the digitizer 165 is shown apart from the monitor 107, the usable input area of the digitizer 165 may be co-extensive with the display area of the monitor 107.

Further still, the digitizer 165 may be integrated in the monitor 107, or may exist as a separate device overlaying or otherwise appended to the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Figure 2:
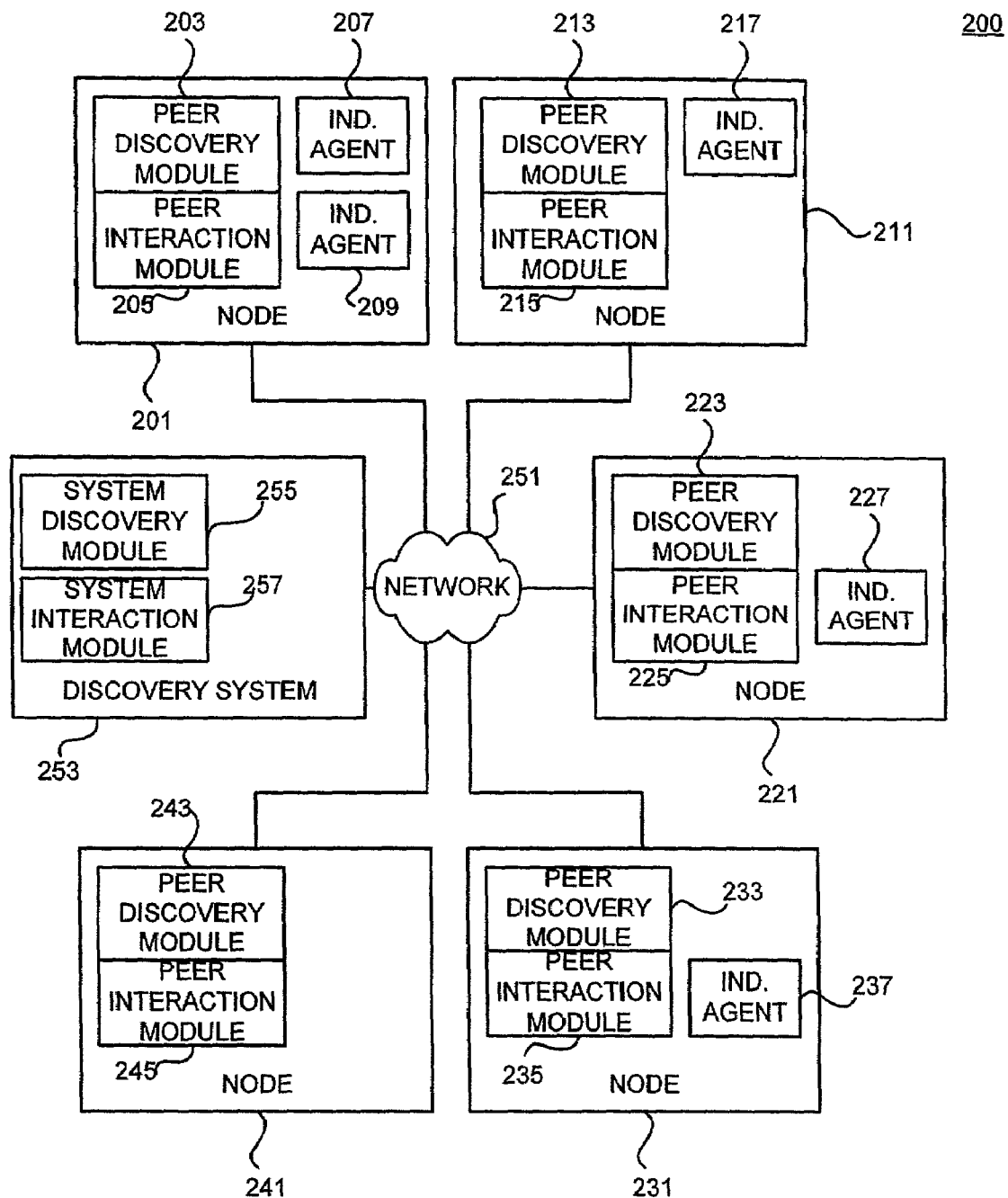
FIG. 2 illustrates a schematic diagram of an unbounded computer space according to an illustrative embodiment of the invention.

With reference to FIG. 2, an unbounded computing space (UCS) 200 includes one or more independent nodes 201, 211, 221, 231, 241 and a discovery system 253. Nodes 201, 211, 221, 231, and 241 are peers of each other. Discovery system 253 may be a server that provides a discovery functionality for unbounded computing space 200. Each node that is a part of the unbounded computing space 200 provides an environment in which software programs, referred to as independent agents, can run. In addition, because each node added to unbounded computing space 200 may have a different configuration from the other nodes (e.g., varying software, resources, hardware, attached peripheral devices, etc.), each node provides a unique computing space. Thus, two different nodes executing the same independent agent may yield different results.

Each node in the unbounded computing space may be thought of similar to a plot of land, with unique characteristics, that executes independent agents received from other nodes within the unbounded computing space. Thus, as each node is added to the unbounded computing space 200, the environment in which independent agents can run increases. Likewise, as nodes are removed from the unbounded computing space 200 (e.g., as a result of a user closing the node application program executing on a computer system), the environment in which independent agents can execute decreases.

The individual nodes that make up the unbounded computing space may depend upon a server for the receipt of independent agent software modules. That is, each node in the unbounded computing space can introduce an independent agent, which may subsequently be copied or transferred to another node within the unbounded computing space.

A node 201 in unbounded computing space 200 includes a peer discovery module 203 and a peer interaction module 205, and often (but not always) includes one or more independent agents 207, 209. Node 201 calls peer discovery module 203 to detect other nodes within the unbounded computing space, and calls peer interaction module 205 to interact with the other detected nodes, e.g., by sending an independent agent to another node and communicating with discovery system 253. As stated above, independent agent 207 or 209 is a code assembly that uses the interaction module to travel to and execute on another node or nodes within the unbounded computing space to perform a function Independent agents can be transported or copied from one node to another, optionally maintaining state information between nodes.

Peer discovery module 203 may communicate with discovery system 253 that maintains a list of active nodes in the unbounded computing space 200. Each new node, upon initialization, may register with discovery system 253 and consequently obtain a listing of a subset of active nodes within the unbounded computing space 200. Each node may subsequently receive an updated list of active nodes in predetermined intervals (e.g., every 2 minutes, 5 minutes, 15 minutes, etc.). According to one aspect of the invention, discovery system 253 may provide to a requesting node a list of the n nodes, where each of the n nodes have the closest IP addresses relative to other nodes.

Discovery system 253 in unbounded computing space 200 comprises a discovery module 255 and a system interaction module 257. Discovery system 253 utilizes system interaction module 257 to communicate with nodes 201, 211, 221, 231, and 241. Also, discovery system 253 utilizes discovery module 255 in order to maintain a list of active nodes in unbounded computing space 200 in accordance with communications (e.g. registrations) with the active nodes. (A process for maintaining the list of active nodes is discussed in the context of FIGS. 4, 5, 6, and 7.) Discovery system 253 uses system interaction module 257 in order to send a message that conveys an appropriate subset of the list of active nodes when communicating with a node (e.g. when node 201 registers).

Unbounded computing space 200 may also include additional nodes 211, 221, 231, 241, with respective peer discovery modules 213, 223, 233, 243, peer interaction modules 215, 225, 235, 245, and independent agents 217, 227, 237. Nodes, generally, are embodied in computer systems interconnected via a network 251 such as the Internet, a LAN, WAN, intranet, etc. Each node may vary in composition from system to system, provided each node can understand the other nodes within the unbounded computing space, e.g., by using a common communication protocol. That is, each node can use a unique algorithm to create and define a computing space that is represented by the node.

Figure 3:
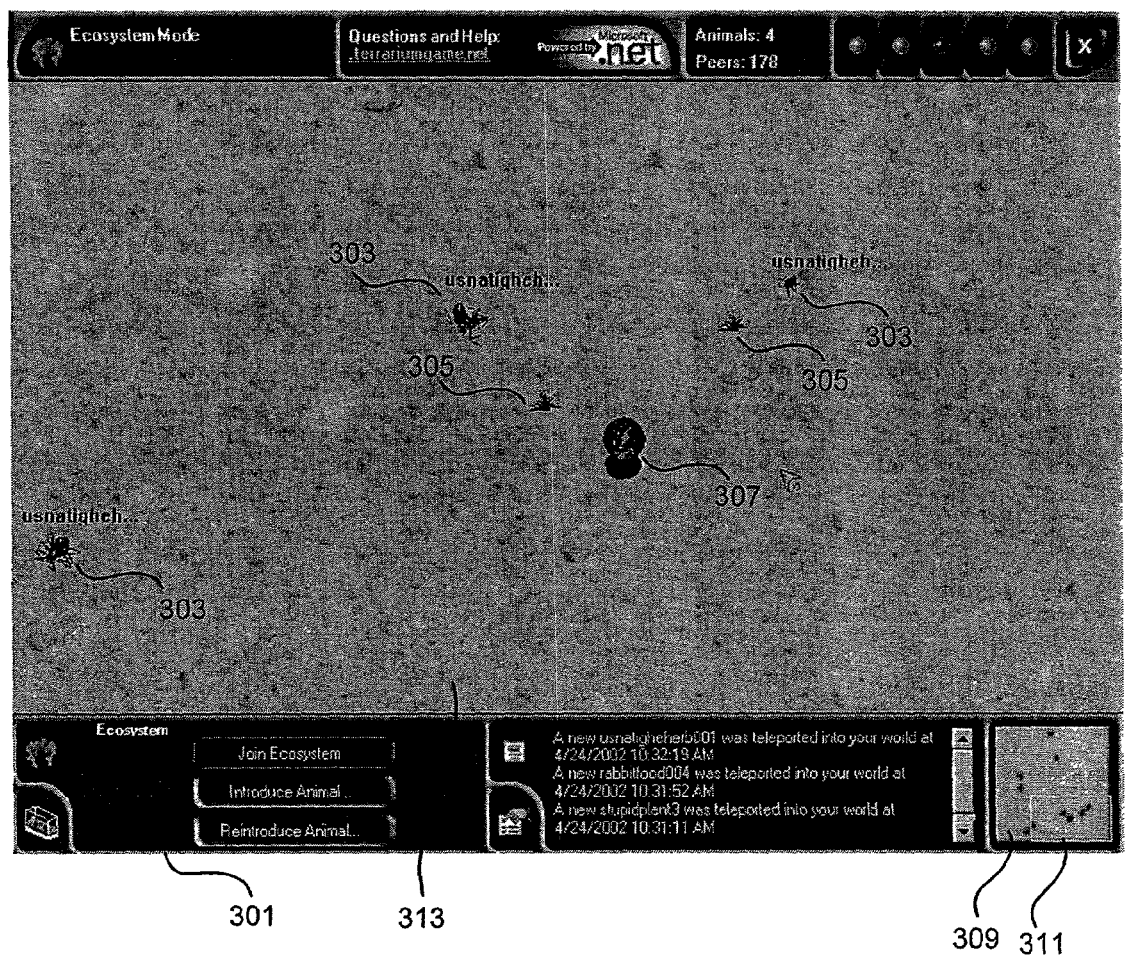
FIG. 3 illustrates a screenshot of a user interface for an unbounded computing space used as an unbounded gaming application according to an illustrative embodiment of the invention.

In one illustrative example, with reference to FIG. 3, nodes may represent physical terrain in a virtual world. FIG. 3 illustrates a user interface for a terrain node 301 that is part of an unbounded computing space that interacts to play a game. Each independent agent 303, 305 may represent an animal or plant that lives and grows (and potentially dies) on the terrain in the virtual world, and that may be transported from one terrain node to another terrain node. Another independent agent 307 might execute only on the terrain node on which it is initially introduced and launched. In this example, independent agent 307 represents a sphere that randomly travels around the terrain of its local terrain node and, upon hitting an independent agent representing an animal or plant, causes the local terrain node to "teleport" the animal or plant to another random terrain node within the unbounded computing space by copying the independent agent to another terrain node along with the current state information of the independent agent. FIG. 3 illustrates only a portion of the terrain of the terrain node 301. Map 309 illustrates the entire terrain located on terrain node 301, and box 311 indicates the visible portion shown in window 313.

Figure 4:
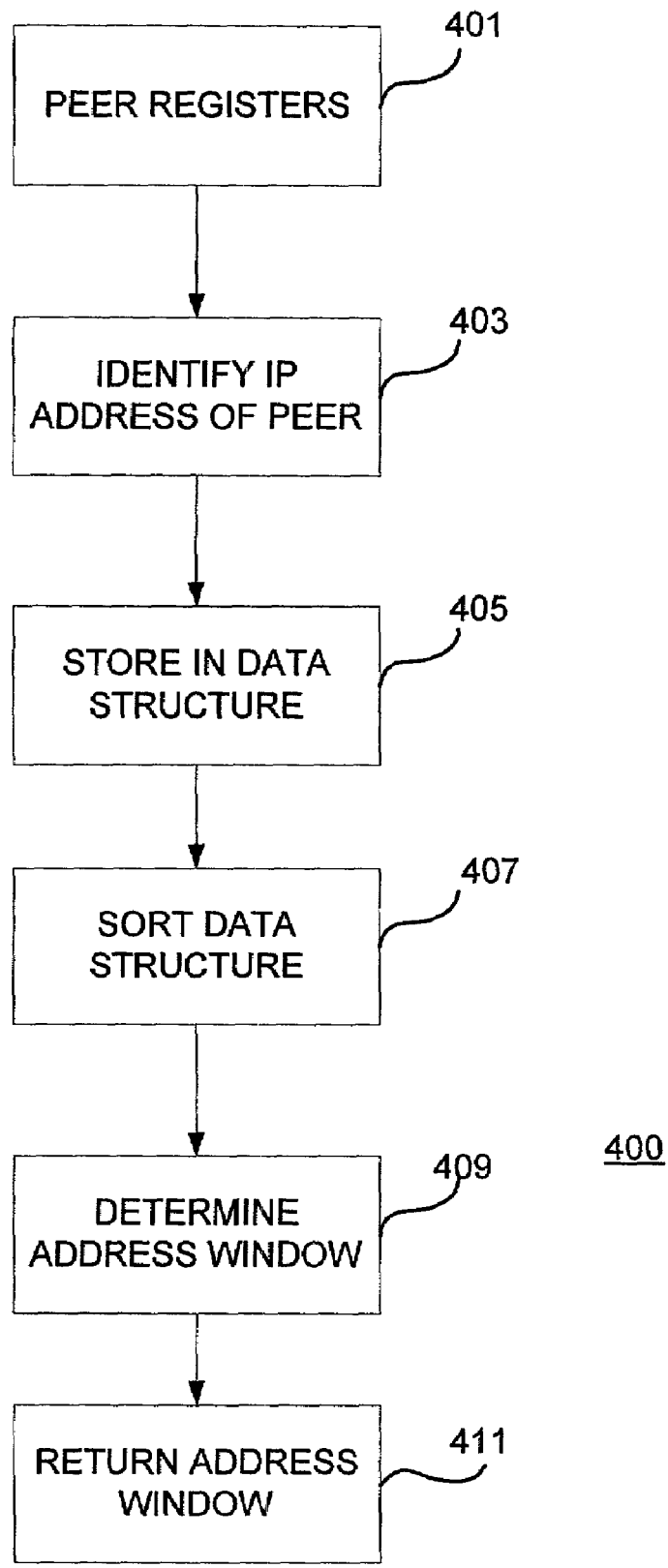
FIG. 4 shows a first process in which a discovery system provides an address window to a node according to an illustrative embodiment of the invention.

FIG. 4 shows a process 400 in which discovery system 253 provides an address window to a node (e.g. nodes 201, 211, 221, 231, or 241) according to an illustrative embodiment of the invention. The node may directly send or receive a message from another node only if a corresponding IP address of the other node is contained in the address window provided by discovery system 253. (A message may comprise information and agent passing that is included in a payload of an IP message.) In step 401, the node (also referred to as a peer) registers with discovery system 253 when the node wishes to participate with unbounded computing space 200. In the embodiment, the node may send an IP message. (Other embodiments may utilize other messaging protocols.) In step 403, discovery system 253 (utilizing system interaction module 257) determines the IP address of the node. With IPv4 the IP address corresponds to a 32-bit address, while with IPv6 the IP address corresponds to a 128-bit address. However, other embodiments may utilize another identifying attribute rather than the IP address. For example, another embodiment may utilize the name of a user associated with the node in which the name is expressed in an alphanumeric string.

Discovery system 253 stores the IP address into a data structure that may be external or internal to discovery system 253 in step 405. In step 407, discovery system 253 sorts the IP addresses that correspond to the active nodes, e.g. the nodes in unbounded computing space 200 that have registered with discovery system 200. Discovery system determines an address window in step 409. In the embodiment, discovery system provides N (e.g. 20) neighboring IP addresses (of other active nodes) that are near the IP address of the node. M (e.g. 5) neighboring IP addresses may precede (i.e. be less than) the IP address of the node while N-M (e.g. 15) IP addresses may succeed (i.e. be greater than) the IP address of the node. If the end of the IP list (as stored in the data structure) is reached, discovery system 253 "wraps-around" to the beginning of the IP list. Discovery system 253 returns an address window in step 411, comprising a subset of the sorted neighboring IP addresses, to the node. (In the embodiment, steps 401, 403, and 411 correspond to system interaction module 257, while steps 405, 407, and 409 correspond to system discovery module 255.)

The IP address of the node (in accordance with IPv4) comprises 4 bytes and may be written as a decimal integer separated by periods (e.g. 192.19.241.18). The IP address comprises two components: a network-prefix portion and a host portion. As an example of the illustrative embodiment, the IP address of the node (e.g. node 201) is 129.61.18.26. The IP address window in the example may be represented as a set of neighboring IP addresses comprising {..., 101.33.16.04, 129.61.18.05, 129.61.18.31, 129.71.21.01, ...}, in which the neighboring IP addresses are ordered according to the magnitudes of the corresponding decimal representations of the neighboring IP addresses.

The parameter N (associated with the number of neighboring IP addresses in the IP address window) and the parameter M (associated with the number of neighboring IP addresses less than the IP address of the node) may be selected in order to improve the operation of unbounded computing space 200. In general, increasing parameters N and M enhances the communicability among the nodes but increases the message length for a message (that may convey the IP address window) between discovery system 253 and the node and may decrease a degree of security in that the node is cognizant of a greater number of neighboring nodes. Also, depending upon the selection of M, the number of preceding neighboring IP addresses and the number of succeeding neighboring IP addresses may or may not be equal. If the number of preceding neighboring IP addresses is not equal to the number of succeeding neighboring IP addresses in an IP address window, then the node may be cognizant of a neighboring node even though the neighboring node is not cognizant of the node. Parameters N and M may be adjusted in accordance with a degree of activity within unbounded computing space 200. Typically, parameters N and M increase as the number of active nodes increases. However, an administrator of unbounded computing space 200 may decrease parameters N and M as the activity increases in order to avoid congestion of network 251 or processing overload of discovery system 253.

Figure 5:
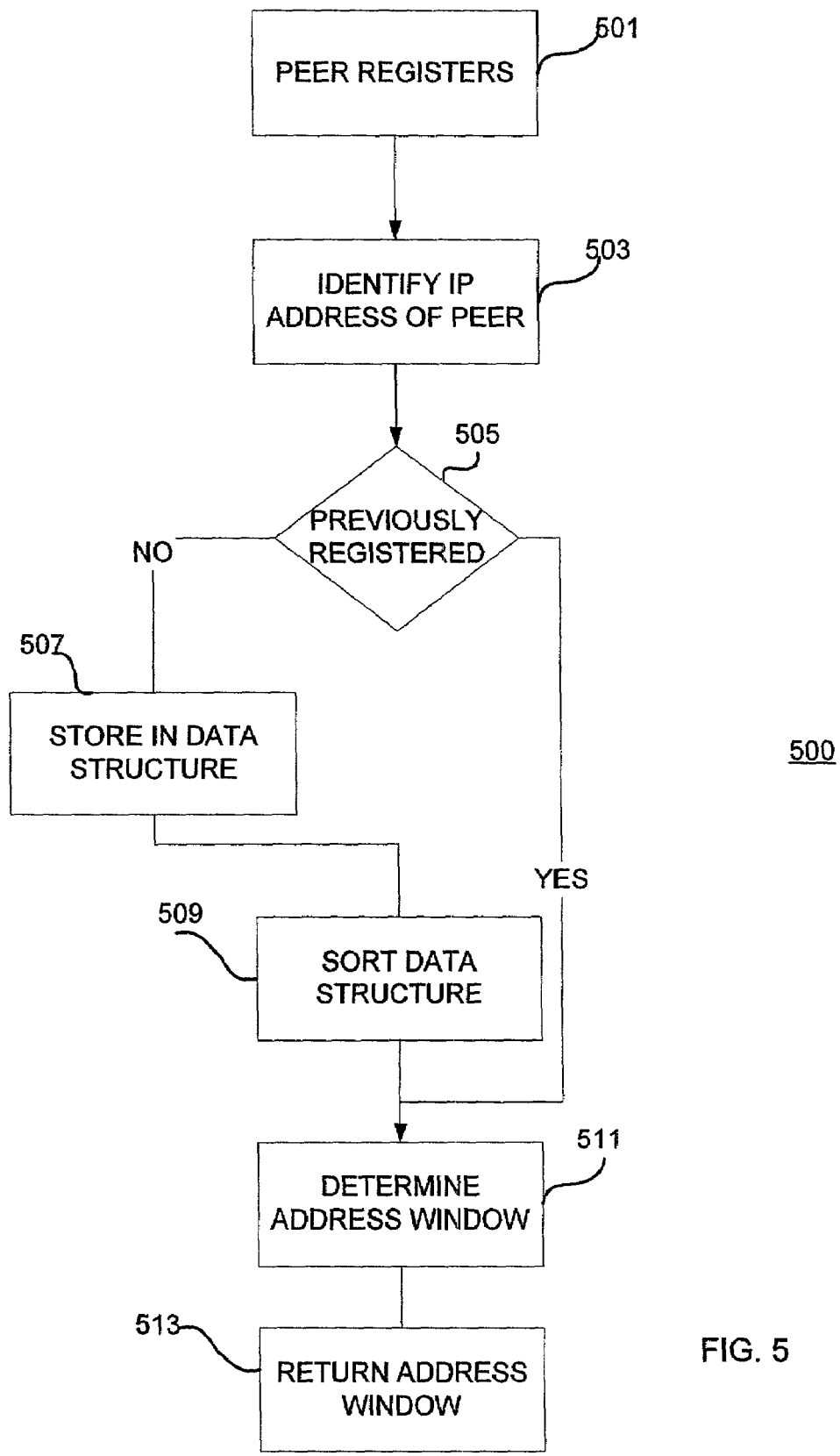
FIG. 5 shows a second process in which a discovery system provides an address window to a node according to an illustrative embodiment of the invention.

FIG. 5 shows a process 500 in which discovery system 253 provides an address window to a node according to an illustrative embodiment of the invention. Steps 501, 503, 507, 509, 511, and 513 correspond to steps 401, 403, 405, 407, 409, and 411 respectively as shown in FIG. 4. However, if a node periodically registers with discovery system 253 in order to obtain an updated address window, discovery system 553 determines whether the node has previously registered in step 505. If so, the IP address list is not updated.

Figure 6:
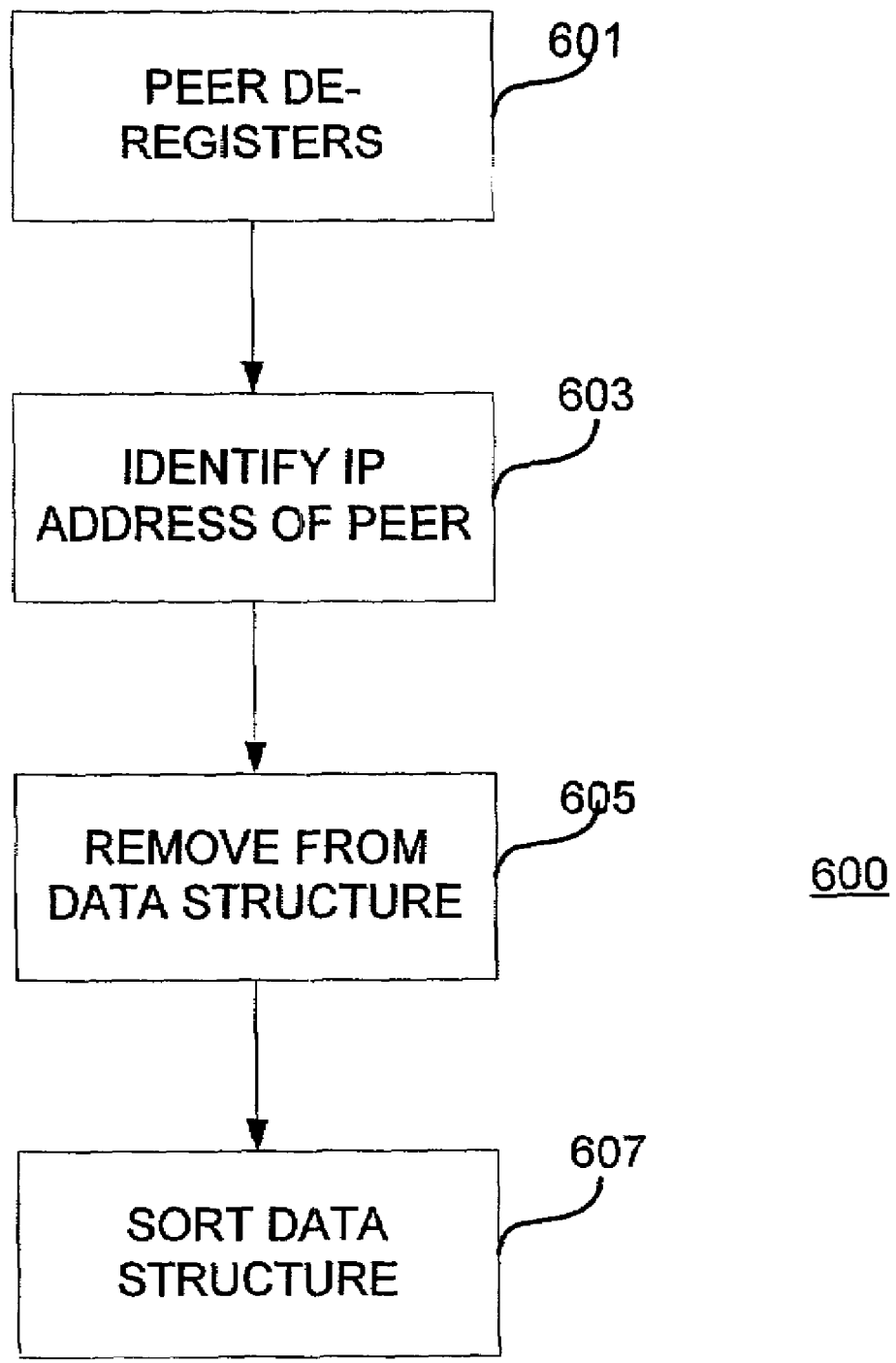
FIG. 6 shows a process in which a node de-registers with a discovery system according to an illustrative embodiment of the invention.

FIG. 6 shows a process 600 in which a node de-registers with discovery system 253 according to an illustrative embodiment of the invention. In step 601, the node de-registers with discovery system 253. As with registration (steps 401 and 501), the node may send an IP message with the IP address of the node. In step 603, discovery system 253 identifies the IP address and removes the IP address from the data structure in step 605. In step 607, discovery system 253 sorts the data structure in order to update the IP address list. In other embodiments, step 607 may be eliminated if, for example, the data structure is a structured as a linked list.

Figure 7:
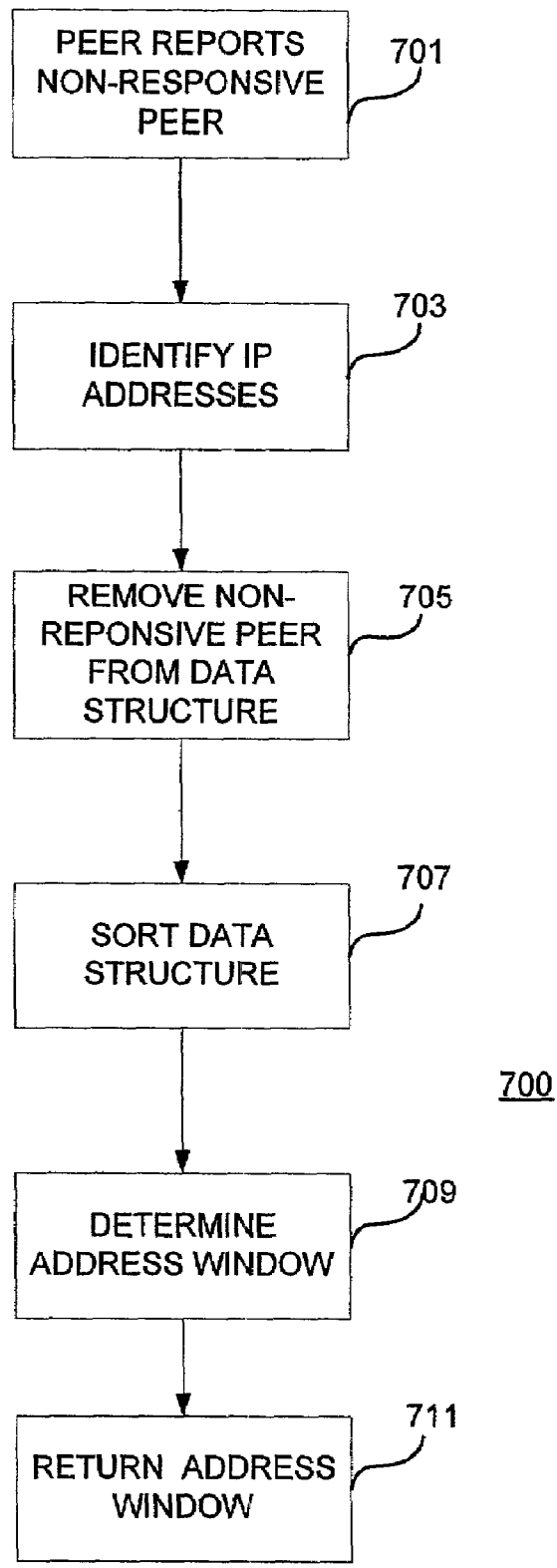
FIG. 7 shows a third process in which a discovery system provides an address window to a node according to an illustrative embodiment of the invention.

FIG. 7 shows a process 700 in which discovery system 253 provides an address window to a node according to an illustrative embodiment of the invention. In step 701, the node reports that another node has been non-responsive to messages sent to the other node even though the IP address of the other node is contained in the node's address window. Discovery system 253 determines the IP address of the reporting node and the IP address of the non-responsive node in step 703. Discovery system 253 removes the IP address of the non-responsive node from the IP address list in step 705, and the updated IP address list is sorted in step 707. In other embodiments, step 707 may be eliminated if, for example, the data structure is a structured as a linked list. In step 709, discovery system 253 determines the address window for the node in step 709 and returns the address window to the node in step 711.

Figure 8:
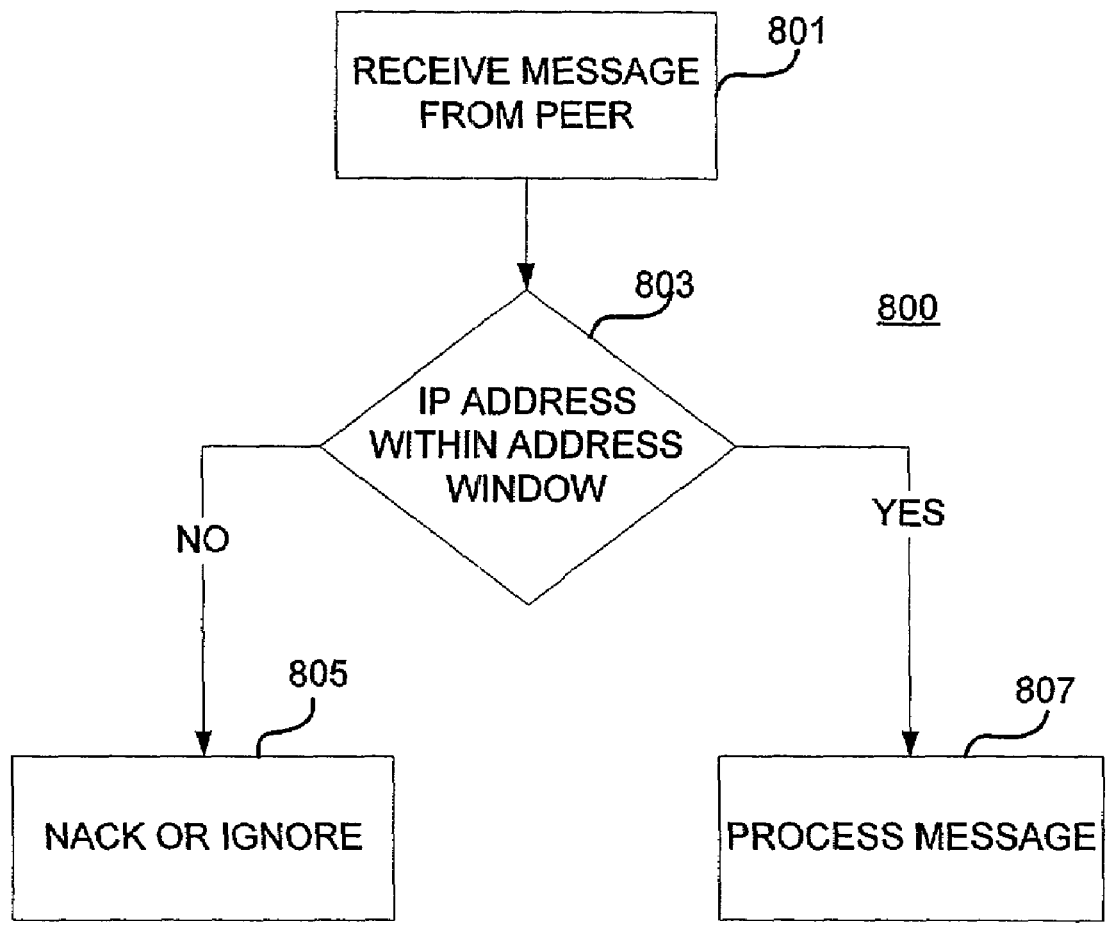
FIG. 8 shows a process in which a receiving node receives a message from another peer according to an illustrative embodiment of the invention.

FIG. 8 shows a process 800 in which a receiving node receives a message from another node according to an illustrative embodiment of the invention. If the node receives a message from another node, which has an IP address that is not contained in the receiving node's address window (as determined in step 803), the receiving node may either ignore the message or return a non-acknowledgment message to the other node in step 805. Otherwise, the receiving node will process the message in step 807.

Figure 9:
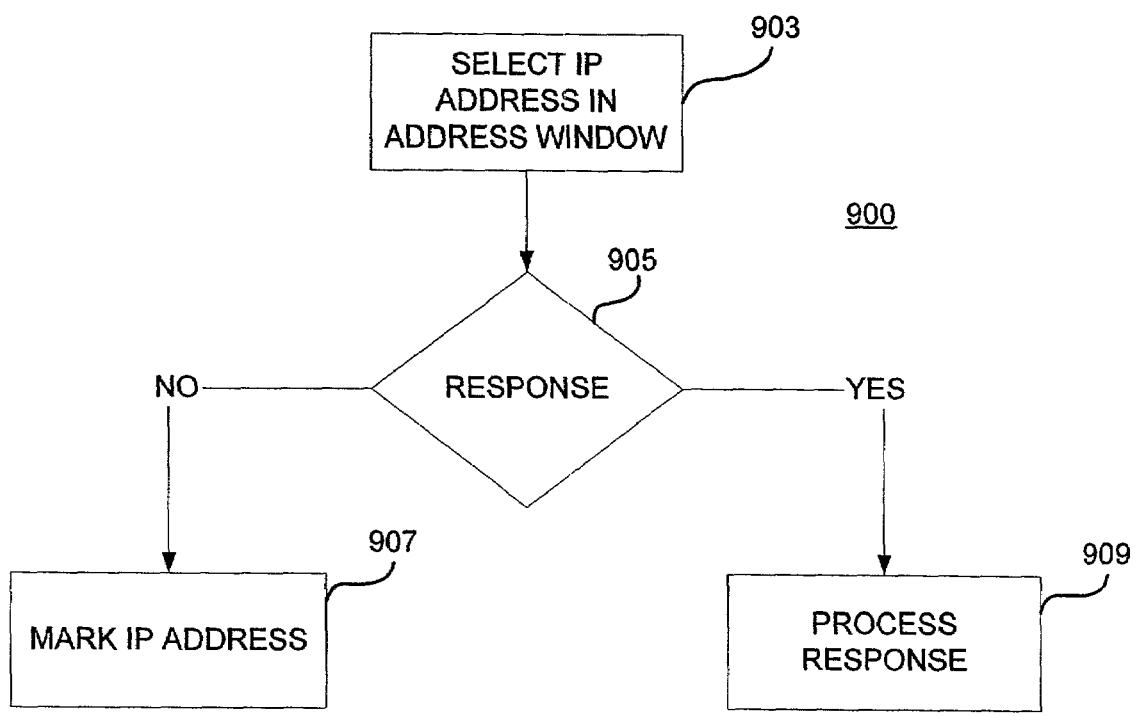
FIG. 9 shows a process in which a transmitting node transmits a message to another peer according to an illustrative embodiment of the invention.

FIG. 9 shows a process 900 in which a transmitting node transmits a message to another node according to an illustrative embodiment of the invention. The transmitting node decides to send a message (e.g. an independent agent that is executing on the transmitting node wants to request an update). The transmitting node determines the IP address of the other node in step 903. In the embodiment, the transmitting node restricts communication only to other nodes that correspond to the transmitting node's address window. If the other node does not respond to the transmitted message, the transmitting node marks the other node as being non-responsive in step 907. Otherwise, the transmitting node processes the response in step 909.

The following table provides an example in accordance with an embodiment of the invention. The example is intended for exemplary purposes. However, unbounded computing space 200 may support thousands or more nodes, and consequently address window parameters may be configured differently in other embodiments than in the example. The table depicts fourteen IP address entries for an address list that is maintained by discovery system 253. Each node (e.g. node A, node B, node C, node D, and node E may correspond to nodes 201, 211, 221, 231, and 241) is assigned an address window. Node A, node B, node C, node D, and node E correspond to IP addresses 01.123.02.131, 11.61.18.26, 12.14.100.201, 129.99.51.101, and 129.99.51.102, respectively. Discovery system 253 assigns address windows WA, WB, WC, WD, and WE to nodes A, B, C, D, and E, respectively. In the example, each address window of a node comprises two IP addresses that precede the IP address of the node and five IP addresses that succeed the IP address of the node. Thus, the window size is equal to seven, in which each node is cognizant of seven other nodes in unbounded computing space 200. If the lower address boundary or the upper address boundary of the address list is encountered when assigning IP address for an address window, discovery system 253 wraps-around to the other boundary of the address list. Even though a node may not be able to communicate with another node, the node may be able to interact indirectly with the other node. For example, Node A can communicate with node E (corresponding to IP address 129.99.51.102) but cannot communicate with a third node having an IP address corresponding to 131.21.18.19. However, for example, node A may indirectly interact with the third node if node A sends an agent program to node E and if node E subsequently sends the agent program to the third node.

TABLE

EXAMPLE FOR ASSIGNING ADDRESS WINDOWS TO NODES

| address list | address window of node A ($W_A$) | address window of node B ($W_B$) | address window of node C ($W_C$) | address window of node D ($W_D$) | address window of node E ($W_E$) |
| --- | --- | --- | --- | --- | --- |
| 01.123.02.131 | node A | $W_B$ | $W_C$ | | |
| 11.61.18.26 | $W_A$ | node B | $W_C$ | $W_D$ | |
| 12.14.100.201 | $W_A$ | $W_B$ | node C | $W_D$ | $W_E$ |
| 129.99.51.101 | $W_A$ | $W_B$ | $W_C$ | node D | $W_E$ |
| 129.99.51.102 | $W_A$ | $W_B$ | $W_C$ | $W_D$ | node E |
| 129.99.51.104 | $W_A$ | $W_B$ | $W_C$ | $W_D$ | $W_E$ |
| 129.99.52.31 | | $W_B$ | $W_C$ | $W_D$ | $W_E$ |
| 131.21.18.19 | | | $W_C$ | $W_D$ | $W_E$ |
| 131.21.18.20 | | | | $W_D$ | $W_E$ |
| 131.21.18.118 | | | | | $W_E$ |
| 131.123.31.17 | | | | | |
| 199.13.18.3 | | | | | |
| 199.14.141.10 | $W_A$ | | | | |
| 201.155.31.18 | $W_A$ | WB | | | |

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A computing system comprising a processor and memory that stores a first node module in which agent programs can execute, the first node module comprising:
   (a) a peer discovery module that receives a window from a discovery system in order to detect a second node module within a distributed computing architecture, wherein
      1. the window comprises a list of other node modules within the distributed computing architecture,
      2. the list comprises the second node module,
      3. the window contains a subset of all node addresses in an unbounded computing space,
      4. the window overlaps with at least another window so that the first node module is able to interact with any node module of the unbounded computing space, and
      5. the window is configured based on a first parameter "N" corresponding to a number of neighboring node modules that have a higher IP address than an IP address of the first node module and a second parameter "M" corresponding to a number of preceding neighboring node modules that have a lower IP address than the IP address of the first node module; and
   (b) a peer interaction module though which the first node module communicates with the second node module in accordance with the window, wherein the window comprises an identifying attribute of the second node module, and wherein the first node module is configured to introduce an agent program that can be sent to the second node module, though the peer interaction module, and wherein the agent program executes in the second node module, wherein the discovery system provides the window and determines the first and second parameters "N" and "M" such that the first node module is able to interact only with node modules contained in the window provided by the discovery system.

2. The computing system of claim 1, wherein the identifying attribute of the second node module corresponds to an IP address that is assigned to the second node module.

3. A discovery system that is associated with an unbounded computing space, comprising:
   a processor; and
   memory storing the following components that are executed by the processor:
      (a) a system interaction module through which the discovery system communicates with a first node module and determines a first identifying attribute of the first node module; and
      (b) a system discovery module that determines a window of the first node module in response to a message received from the first node module through the system interaction module, wherein
         1. the window comprises a list of other node modules within the distributed computing space,
         2. the list comprises a second node module that is associated with a second identifying attribute,
         3. the window contains a subset of all node addresses in the unbounded computing space,
         4. the window overlaps with at least another window so that the first node module is able to interact with any node module of the unbounded computing space, and
         5. the window is configured by a first parameter "N" corresponding to a number of neighboring nodes that have a higher IP address than an IP address of the first node module and a second parameter "M" corresponding to a number of preceding neighboring nodes that have a lower IP address than an IP address of the first node module, wherein the discovery system provides the window and determines the first and second parameters "N" and "M" such that the first node module is able to interact only with node modules contained in the window provided by the discovery system.

4. The discovery system of claim 3, wherein the first identifying attribute corresponds to a first IP address of the first node module and the second identifying attribute corresponds to a second IP address of the second node module.

5. A distributed computing architecture including a plurality of computing systems, comprising:
   (a) a plurality of node modules in which agent programs can execute, each node module being stored in memory and executed by a processor of a computing system in the distributed computing architecture, wherein the plurality of node modules comprises a first node module and a second node module, each node module comprising:
      (i) a peer discovery module that receives an address window of the node module in order to detect the other node module within the distributed computing architecture, wherein
         1. the address window contains a subset of all node addresses in an unbounded computing space, and
         2. the address window overlaps with at least a second address window so that the node module is able to interact with any node module of the unbounded computing space; and
      (ii) a peer interaction module through which the node module communicates with the other node module in accordance with the address window, wherein the address window comprises a second address of the other node module, and wherein the first node module is capable of introducing an agent program that can be sent to the other node module, through the peer interaction module, and execute on the other node module, and wherein the peer interaction module of the node module is configured to determine whether to process a message sent by the other node module to the node module, based on whether the other node module is in the address window; and
   (b) at least one discovery system, each discovery system comprising:
      (i) a system interaction module through which the discovery system communicates with the node module and determines an address of the node module; and
      (ii) a system discovery module that determines the address window of the node module in response to a message received from the node module through the system interaction module, wherein:
         (1) the address window is configured based on a first parameter "N" corresponding to a number of neighboring nodes that have a higher IP address than an IP address of the first node module and a parameter "M" corresponding to a number of preceding neighboring nodes that have a lower IP address than an IP address of the node module, and
         (2) the address window comprises the second address of the other node module,
         wherein the discovery system is connected to the plurality of node modules, and
         wherein the discovery system provides the window and determines the first and second parameters "N" and "M" such that the first node module is only able to interact with node modules contained in the window provided by the discovery system.

6. A method for partitioning an unbounded computing space including a plurality of nodes and at least one discovery system connected to the plurality of nodes, the method comprising:
- (a) receiving a first notification from a first node in order to register the first node;
- (b) determining a first address that is associated with the first node;
- (c) entering the first address into a list of addresses;
- (d) selecting a subset of the list of addresses, the subset comprising addresses of other nodes that are associated with the unbounded computing space;
- (e) providing a first address window to the first node, wherein the first address window comprises the subset of addresses in the unbounded computing space, and wherein the first address window is configured based on a parameter "N" corresponding to a number of neighboring nodes that have a higher IP address than an IP address of the first node and a parameter "M" corresponding to a number of neighboring nodes that have a lower IP address than the IP address of the first node; and
- (f) overlapping the first address window with at least a second address window in accordance with the parameter "M" so that the first node is able to interact with any node of the unbounded computing space, wherein the steps (a)-(f) are performed by the discovery system and the discovery system provides the first and second windows and determines the parameters "N" and "M" such that the first node is able to interact only with nodes included in the first window provided by the discovery system.

7. The method of claim 6, wherein the list of addresses is associated with IP addresses.

8. The method of claim 6, further comprising:
- (g) sorting the list of addresses.

9. The method of claim 6, further comprising:
- (g) receiving a second notification from the first node in order to provide an updated first address window;
- (h) selecting an updated subset of the list of addresses, wherein the updated subset is derived from the subset; and
- (i) providing the updated first address window to the first node, wherein the updated first address window comprises the updated subset of addresses.

10. The method of claim 6, further comprising:
- (g) receiving a second notification from the first node in order to remove the first node from the unbounded computing space; and
- (h) removing the first address from the list of addresses.

11. The method of claim 10, further comprising
- (i) sorting the list of addresses.

12. The method of claim 6, wherein a second address corresponding to a second node is contained in the address window, an the method further comprises:
- (g) receiving a second notification from the first node that the second node is nonresponsive; and
- (h) removing the second address from the list of addresses.

13. The method of claim 12, further comprising:
- (i) sorting the list of addresses.

14. The method of claim 12, further comprising:
- (j) providing an updated first address window to the first node.

15. The method of claim 6, further comprising:
- (f) updating the another paramater in accordance with a degree of activity that is associated with the unbounded computing space.

16. The method of claim 6, further comprising:
- (f) updating the parameter corresponding to the number of neighboring nodes in accordance with a degree of activity in the unbounded computing space.

17. A method for executing a program on a distributed computer system including a discovery system connected to a plurality of nodes, the method comprising:
- (a) sending to the discovery system, by a first node, a first notification in order to register the first node on the distributed computer system;
- (b) receiving from the discovery system, by the first node, a first address window, wherein the first address window contains a subset of all node addresses in an unbounded computing space and wherein the first address window is configured by a first parameter "N" corresponding to a number of neighboring nodes that have a higher IP address than an IP address of the first node and a second parameter "M" corresponding to a number of preceding neighboring nodes that have a lower IP address than an IP address of the first node;
- (c) sending, by the first node, a first message to a second node only if an address of the second node is contained in the first address window; and
- (d) determining, by the first node, whether to process a communication received by the first node based on whether a sender node associated with the communication is in the first address window, wherein the discovery system provides the first address window and determines the parameters "N" and "M" such that the first node is able to interact only with nodes contained in the window provided by the discovery system.

18. The method of claim 17, wherein the first message is associated with a first agent program.

19. The method of claim 18, further comprising:
- (e) receiving from the discovery system, by the second node, a second address window; and
- (f) sending, by the second node, the first agent program to a third node only if an address of the third node is contained in the second address window.

20. The method of claim 17, further comprising:
- (e) accepting, by the first node, a second message from the second node only if the address of the second node is contained in the first address window.

21. The method of claim 20, wherein the second message is associated with a second agent program.

22. The method of claim 17, further comprising:
- (e) sending, by the first node, a second notification in order to obtain an updated first address window, in response to detecting an expiration of a preset time interval;
- (f) receiving, by the first node, the updated first address window; and
- (g) sending, by the first node, the first message to the second node only if the address of the second node is contained in the updated first address window.

23. The method of claim 17, further comprising:
- (e) determining, by the first node, that the second node is non-responsive;
- (f) sending, by the first node, a second notification that the second node is nonresponsive; and
- (g) receiving, by the first node, an updated first address window.

24. The method of claim 17, further comprising:
- (e) sending, by the first node, a second notification to request that the first node be removed from the distributed computer system.

* * * * *